US010415703B2

(12) United States Patent
Tachibanada

(10) Patent No.: US 10,415,703 B2
(45) Date of Patent: Sep. 17, 2019

(54) CONTROL APPARATUS AND CONTROL SYSTEM

(71) Applicant: HONDA MOTOR CO., LTD., Tokyo (JP)

(72) Inventor: Yuya Tachibanada, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 15/917,991

(22) Filed: Mar. 12, 2018

(65) Prior Publication Data

US 2018/0283551 A1 Oct. 4, 2018

(30) Foreign Application Priority Data

Mar. 29, 2017 (JP) .................................. 2017-065741

(51) Int. Cl.
*F02D 41/00* (2006.01)
*B60W 30/194* (2012.01)
(Continued)

(52) U.S. Cl.
CPC ......... *F16H 63/50* (2013.01); *F02D 41/0215* (2013.01); *F16H 61/143* (2013.01);
(Continued)

(58) Field of Classification Search
CPC ........... Y10T 477/755; Y10T 477/6403; Y10T 477/641; Y10T 477/633; Y10T 477/6395; Y10T 477/70; Y10T 477/75; Y10T 477/753; Y10T 477/735; Y10T 477/6352; F16H 2061/145; F16H 61/143;
(Continued)

(56) References Cited

U.S. PATENT DOCUMENTS

| 5,733,223 A * | 3/1998 | Matsubara ............ B60W 10/06 477/169 |
| 6,217,481 B1 * | 4/2001 | Watanabe ............. F16H 61/143 192/3.31 |
| 9,340,210 B2 | 5/2016 | Ishikawa et al. |
| 2004/0144608 A1 * | 7/2004 | Kobayashi ............. F16H 57/04 192/3.3 |
| 2010/0174460 A1 * | 7/2010 | Gibson ............... B60W 10/026 701/54 |

(Continued)

FOREIGN PATENT DOCUMENTS

| JP | H06-280629 A | 10/1994 |
| JP | H10-141099 A | 5/1998 |

(Continued)

OTHER PUBLICATIONS

Decision to Grant a Patent, dated Aug. 10, 2018, in Japanese Patent Application No. 2017-065741, 6 pages.

*Primary Examiner* — Jacob S. Scott
*Assistant Examiner* — Lillian T Nguyen
(74) *Attorney, Agent, or Firm* — Thomas | Horstemeyer, LLP

(57) ABSTRACT

A control apparatus for controlling an automatic transmission including a torque converter to which a driving force of an engine is input includes a specifying unit configured to specify a drag torque of a wet friction type lock-up clutch, and a transmission unit configured to transmit load information including at least the drag torque specified by the specifying unit to a control apparatus of the engine. The specifying unit specifies the drag torque of the lock-up clutch during in-gear based on a slip ratio of the torque converter before in-gear when the lock-up clutch is released.

6 Claims, 6 Drawing Sheets

(51) Int. Cl.
  *F16H 63/50*  (2006.01)
  *F02D 41/02*  (2006.01)
  *F16H 61/14*  (2006.01)
  *F16H 45/02*  (2006.01)
  *F16H 59/72*  (2006.01)

(52) U.S. Cl.
  CPC ............... *F02D 2200/023* (2013.01); *F02D 2200/1006* (2013.01); *F16H 45/02* (2013.01); *F16H 59/72* (2013.01); *F16H 2312/02* (2013.01)

(58) Field of Classification Search
  CPC .... F16H 2059/467; F16H 61/14; F16H 45/02; F02D 41/0215; F02D 2200/023; F02D 2200/1006; B60W 30/194
  See application file for complete search history.

(56) References Cited

U.S. PATENT DOCUMENTS

| | | | |
|---|---|---|---|
| 2014/0350808 A1* | 11/2014 | Tachibanada | F16H 61/68 701/58 |
| 2016/0319915 A1* | 11/2016 | Ishikawa | F16H 3/66 |
| 2017/0138465 A1* | 5/2017 | Tachibanada | F16H 61/0204 |

FOREIGN PATENT DOCUMENTS

| | | |
|---|---|---|
| JP | H11-062652 A | 3/1999 |
| JP | 2010-084691 A | 4/2010 |
| JP | 2012-237207 A | 12/2012 |
| WO | 2014/017239 A1 | 1/2014 |

* cited by examiner

FIG. 2A

|      | C1 | C2 | C3 | B1 | B2 | B3 | F1   | GEAR RATIO |
|------|----|----|----|----|----|----|------|------------|
| RVS  |    |    | O  |    | O  |    | O    | 4.008      |
| 1st  |    |    |    | O  | O  | (O)| △/O  | 5.233      |
| 2nd  |    | O  |    | O  | O  |    | (△)  | 3.367      |
| 3rd  |    |    | O  | O  | O  |    | (△)  | 2.298      |
| 4th  |    | O  | O  | O  |    |    | (△)  | 1.705      |
| 5th  | O  |    | O  | O  |    |    | (△)  | 1.363      |
| 6th  | O  | O  | O  |    |    |    | (△)  | 1.000      |
| 7th  | O  |    | O  |    | O  |    | (△)  | 0.786      |
| 8th  | O  | O  |    |    | O  |    | (△)  | 0.657      |
| 9th  | O  |    |    |    | O  | O  | (△)  | 0.584      |
| 10th | O  | O  |    |    |    | O  | (△)  | 0.520      |
| P/N  |    |    |    |    |    |    | △/O  | —          |

FIG. 2B

| PLANETARY GEAR MECHANISM | GEAR RATIO |
|--------------------------|------------|
| P1                       | 2.681      |
| P2                       | 1.914      |
| P3                       | 1.614      |
| P4                       | 2.734      |

CONTROL APPARATUS AND CONTROL SYSTEM

BACKGROUND OF THE INVENTION

Field of the Invention

The present invention relates to a control technique of a vehicle.

Description of the Related Art

There have been proposed systems each of which controls an engine by communication between a control apparatus that controls an automatic transmission and a control apparatus that controls the engine (for example, Japanese Patent Laid-Open Nos. 6-280629, 2010-84691, 11-62652, and 10-141099).

In an automatic transmission including a torque converter, for example, when the engine is just started in an extremely cold environment, and the temperature of hydraulic oil is low, the drag torque of the lock-up clutch becomes large. The increase in the drag torque is the factor that increases the load of the engine. Hence, at the time of the first in-gear after the start of the engine where the drag torque readily becomes large, the engine speed can be stabilized by increasing the output torque of the engine. However, the drag torque varies due to the individual difference of the torque converter including the lock-up clutch. If the increase amount of the output torque of the engine is even, racing or an excessive decrease in the rotation speed may occur due to the individual difference of the torque converter.

SUMMARY OF THE INVENTION

It is an object of the present invention to improve the stability of an engine speed when controlling the output torque of an engine in correspondence with the drag torque of a lock-up clutch.

According to an aspect of the present invention, there is provided a control apparatus for controlling an automatic transmission including a torque converter to which a driving force of an engine is input, the torque converter including a wet friction type lock-up clutch, the control apparatus comprises: a specifying unit configured to specify a drag torque of the lock-up clutch; and a transmission unit configured to transmit load information including at least the drag torque specified by the specifying unit to a control apparatus of the engine, and the specifying unit specifies the drag torque of the lock-up clutch during in-gear based on a slip ratio of the torque converter before in-gear when the lock-up clutch is released.

According to another aspect of the present invention, there is also provided a control system comprising: a first control apparatus configured to control an engine; and a second control apparatus configured to control an automatic transmission including a torque converter to which a driving force of the engine is input, the torque converter including a wet friction type lock-up clutch, wherein the second control apparatus comprises: a specifying unit configured to specify a drag torque of the lock-up clutch; and a transmission unit configured to transmit load information including at least the drag torque specified by the specifying unit to a control apparatus of the engine, the first control apparatus executes driving control of the engine based on the load information, and the specifying unit specifies the drag torque of the lock-up clutch during in-gear based on a slip ratio of the torque converter before in-gear when the lock-up clutch is released.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

DESCRIPTION OF THE EMBODIMENTS

Figure 1:
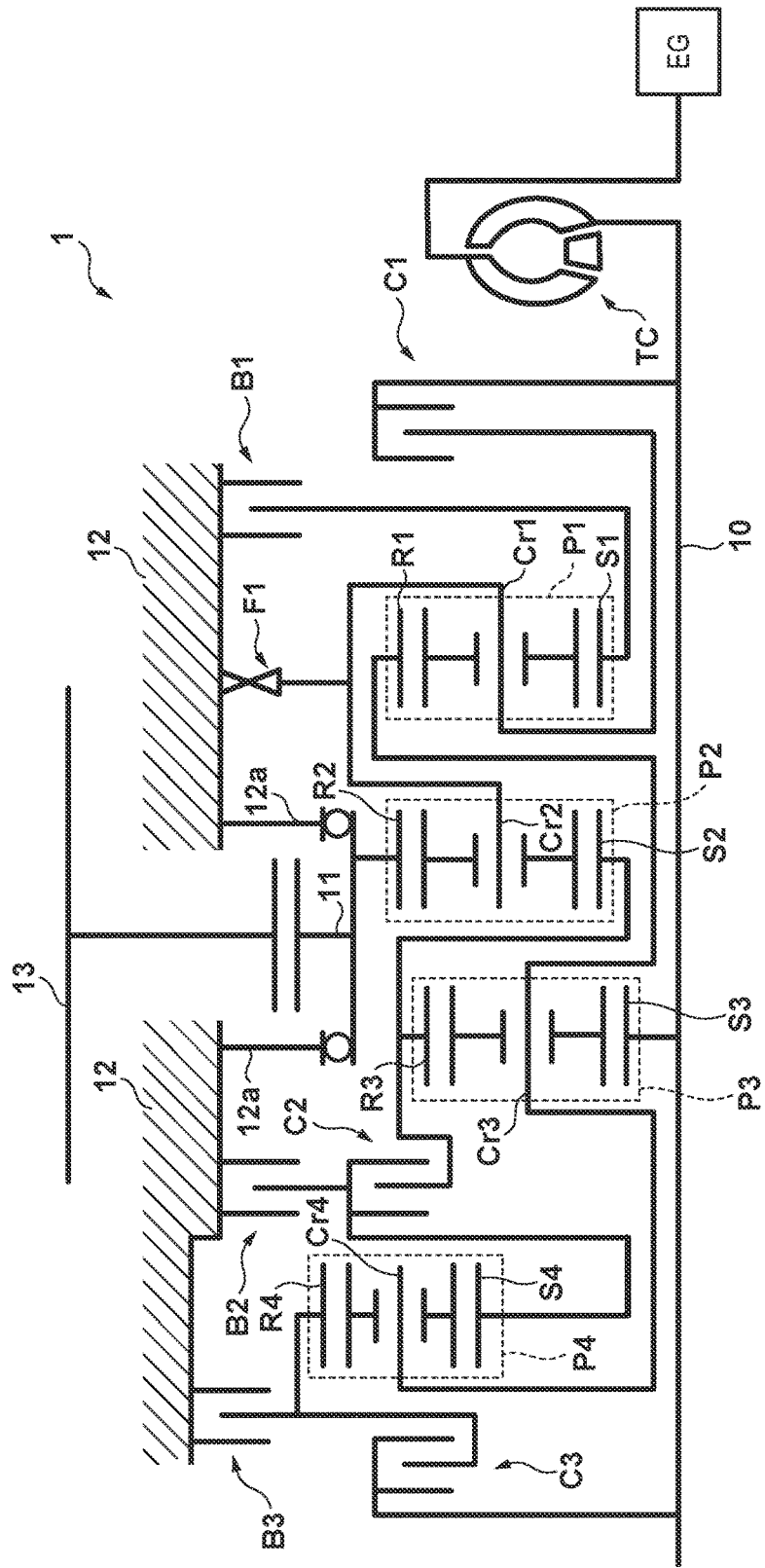
FIG. 1 is a skeleton diagram of an automatic transmission according to an embodiment of the present invention.

FIG. 1 is a skeleton diagram of an automatic transmission 1 according to an embodiment of the present invention. Referring to FIG. 1, the automatic transmission 1 includes an input shaft 10 rotatably axially supported in a casing 12 that forms a transmission case, an output member 11 rotatably supported by support members 12a supported in the casing 12 so as to be coaxial with respect to the input shaft 10, and an output shaft (counter shaft) 13.

A driving force from an engine EG (to be sometimes simply referred to as EG) that is an internal combustion engine is input to the input shaft 10, and the input shaft 10 is rotated by the driving force. A starting device is provided between the input shaft 10 and the engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the engine EG is input to the input shaft 10 through the torque converter TC. The torque converter TC includes a lock-up clutch LC. The lock-up clutch LC is a wet friction type clutch, and for example, a multiple disc clutch. In a fastening state by hydraulic driving of the lock-up clutch LC, the output shaft and the input shaft 10 of the engine EG are set in a directly connected state. In a release state, the directly connected state is canceled.

The output member 11 includes a gear concentric to the input shaft 10. The output shaft 13 includes a gear that meshes with the gear. The rotation of the input shaft 10 changes its speed through transmission mechanisms to be described below and is then transmitted to the output shaft 13. The rotation (driving force) of the output shaft 13 is transmitted to driving wheels through, for example, differential gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the input shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the input shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, a 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects the rotational elements provided in the automatic transmission 1 to/from the casing 12. The rotational elements provided in the automatic transmission 1 include the input shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the input shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the input shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the output shaft 13.

The clutch C1 connects the input shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the input shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the input shaft 10 and the output member 11.

In this embodiment, a running range that transmits the driving force to the wheel side and a non-running range that does not transmit the driving force are included in selectable shift ranges. In the running range, 10 forward ranges or gears (1st to 10th) and one reverse range or gear (RVS) can be established. "P/N" represents non-running ranges; "P", a parking range; and "N", a neutral range.

In the example of the engagement table shown in FIG. 2A, "◯" indicates the engaging state, and no mark indicates the release state. Note that there are included engaging mechanisms that are set in the engaging state for smooth change to adjacent gear ranges, although the engagement is not essential to establish the gear ranges. For example, in the 1st gear (1st), engagement of the brake B2 is not essential. However, when changing to the reverse range (RVS) or 2nd gear (2nd), the brake B2 is set in the engaging state for the purpose of decreasing the engaging mechanisms to switch the engaging state. Similarly, in the 5th gear (5th), engagement of the clutch C3 is not essential. However, when changing to the 4th gear (4th) or 6th gear (6th), the clutch C3 is set in the engaging state for the purpose of decreasing the engaging mechanisms to switch the engaging state.

As for the brake F1, "◯" indicates the rotation inhibition state, and "Δ" indicates the one-way rotation permission state. In the 1st gear (1st), the brake F1 can be set in either the rotation inhibition state or the one-way rotation permission state. In the rotation inhibition state, the engine brake is enabled. In the 1st gear, the brake F1 is set in the one-way rotation permission state. The engine brake is switched between the enabled state and a disabled state by engaging or releasing the brake B3. In FIG. 2A, "◯" of the brake B3 in the 1st gear (1st) indicates this.

An algorithm to determine which state is set for the brake F1 in the 1st gear (1st) can appropriately be designed. In this embodiment, the state before a change to the 1st gear (1st) is inherited. For example, when changed from the reverse range (RVS) to the 1st gear (1st), the brake F1 remains in the rotation inhibition state in the 1st gear (1st). However, if, for example, the vehicle speed exceeds a predetermined speed, the brake F1 is switched to the one-way rotation permission state. Similarly, when changed from other forward ranges (2nd to 10th) to the 1st gear (1st), the brake F1 remains in the one-way rotation permission state in the 1st gear (1st).

In the non-running ranges (P/N) as well, the state of the brake F1 can be either the rotation inhibition state or the one-way rotation permission state. In this embodiment, the state before a change to the non-running ranges (P/N) is inherited, as in the 1st gear (1st).

In the 2nd gear (2nd) to the 10th gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Note that in this embodiment, the one-way rotation permission state is selected as the state of the brake F1 in each of the 2nd gear (2nd) to the 10th gear (10th), and these ranges cannot be established in the rotation inhibition state. However, an arrangement that selects the rotation inhibition state can also be employed depending on the arrangement of the automatic transmission 1.

Figure 3:
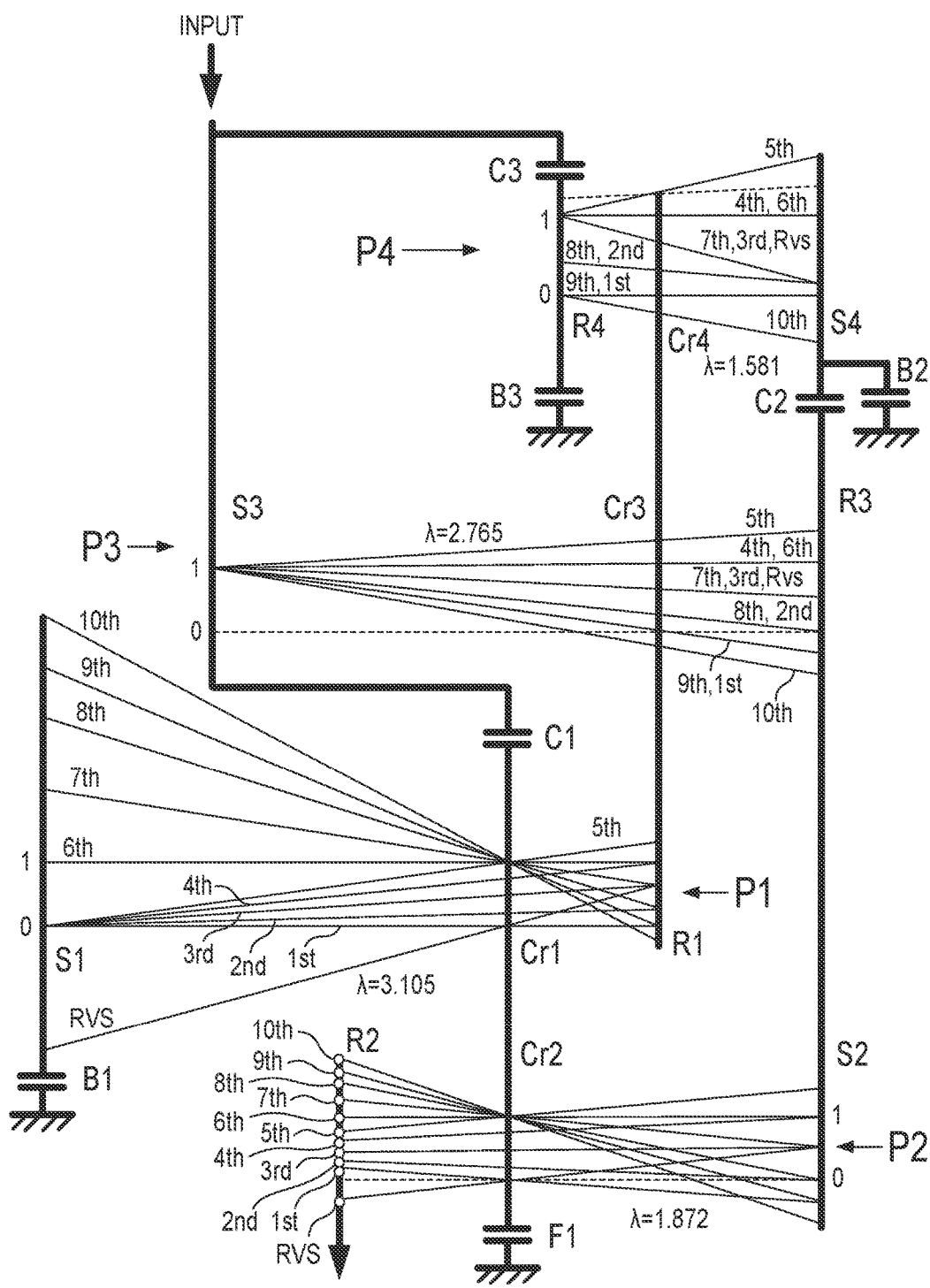
FIG. 3 is a velocity diagram of the automatic transmission shown in FIG. 1.

The velocity diagram of FIG. 3 shows the rotation speed ratio of each element to the input to the input shaft 10 in each gear range. The ordinate represents the speed ratio. "1" indicates the same rotation speed as the input shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the output shaft 13 are not illustrated.

<Control System>

Figure 4:
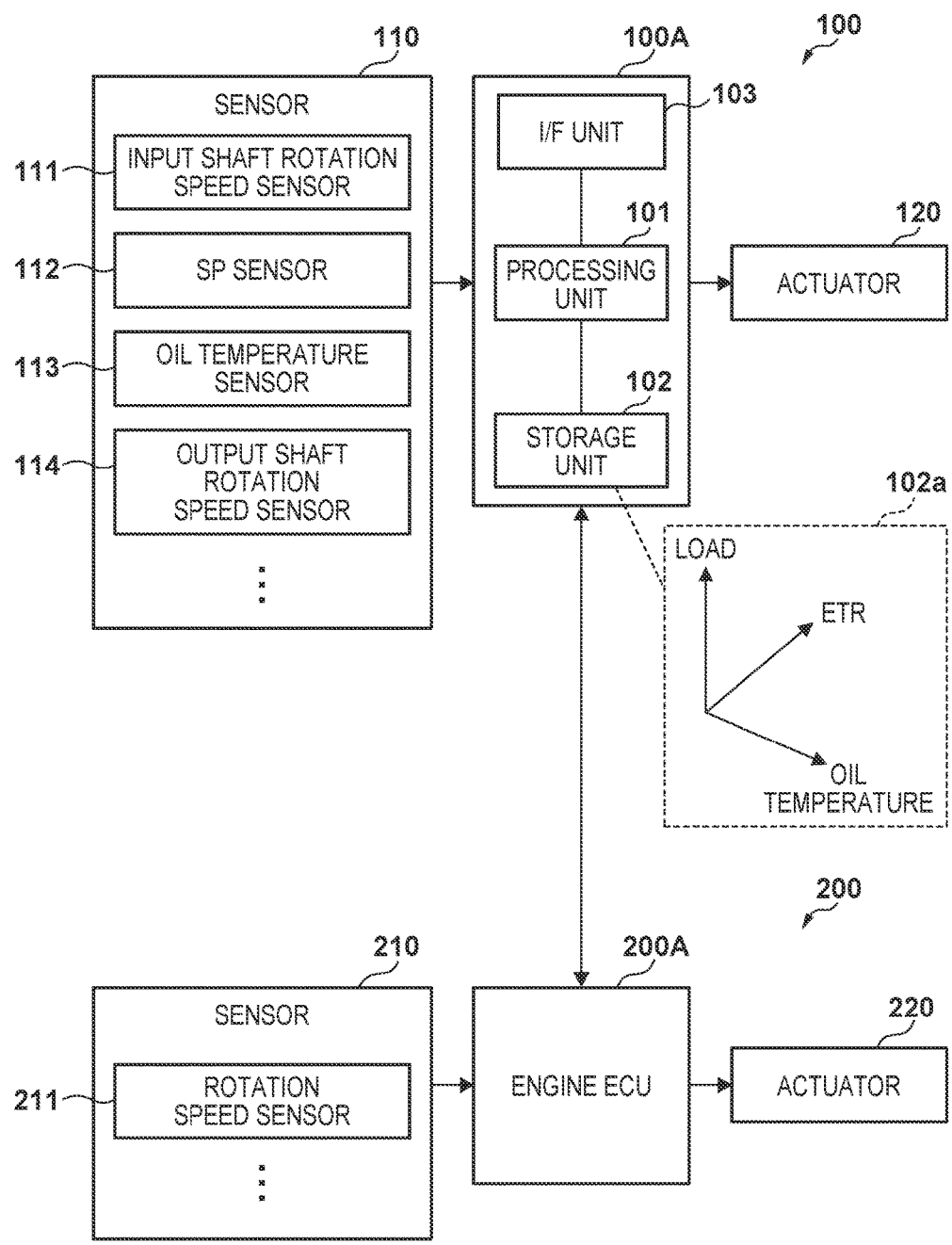
FIG. 4 is a block diagram of a control system.

FIG. 4 is a block diagram of the control system of the automatic transmission 1 and the engine EG. The system includes a control apparatus 100 that controls the automatic transmission 1 including the torque converter TC, and a control apparatus 200 that controls the engine EG.

The control apparatus 100 includes an ECU 100A as a control unit. The ECU 100A includes a processing unit 101 such as a CPU, a storage unit 102 such as a RAM and ROM, and an I/F unit 103 that interfaces between the processing unit 101 and an external device or an ECU 200A on the engine side. The I/F unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4 illustrates the following sensors. An input shaft rotation speed sensor 111 is a sensor that detects the rotation speed of the input shaft 10. The rotation speed of the input shaft 10 will sometimes be referred to as an input shaft rotation speed. An SP sensor (shift position sensor) 112 is a sensor that detects a shift position selected by the driver. In this embodiment, four types of shift positions, that is, P range (parking range), D range (forward range), N range (neutral range), and R range (reverse range) are assumed. If the D range is selected, the processing unit 101 selects one of the 1st gear (1st) to the 10th gear (10th) in accordance with a gear change map stored in the storage unit 102 and changes the gear. If the R range is selected, the processing unit 101 selects the reverse range.

An oil temperature sensor 113 detects the temperature of hydraulic oil in the automatic transmission 1. The hydraulic oil includes the hydraulic oil of the torque converter TC (lock-up clutch LC). An output shaft sensor 114 is a sensor that detects the rotation speed of the output shaft 13. The rotation speed of the output shaft 13 will sometimes be referred to as an output shaft rotation speed.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1, and the lock-up clutch LC.

The storage unit 102 includes a map 102a used to specify the drag torque in the release state of the lock-up clutch LC at the time of the first in-gear after the engine start. In this embodiment, the map 102a is data that specifies the drag torque based on the detection result of the oil temperature sensor 113 and the ETR. The map 102a is set by experiments or the like. ETR is the slip ratio of the torque converter TC. The ECU 100A calculates the ETR by ETR (%)=(input shaft rotation speed [rpm]/(actual engine speed [rpm])×100

The control apparatus 200 includes the ECU 200A as a control unit. The ECU 200A includes a processing unit such as a CPU, a storage unit such as a RAM and ROM, and an IF unit that interfaces between the processing unit and an external device or the ECU 100A, like the ECU 100A. The IF unit is formed from, for example, a communication interface or an input/output interface. The ECUs 100A and 200A can transmit/receive information.

Various kinds of sensors 210 include various kinds of sensors provided in the engine EG. FIG. 4 shows a rotation speed sensor 211. The rotation speed sensor 211 is a sensor that detects the engine speed of the engine EG, that is, the rotation speed (actual engine speed) input from the engine EG to the torque converter TC. The various kinds of sensors 210 also include sensors needed for the control of the engine EG, such as a sensor that detects the accelerator position. Various kinds of actuators 220 include various kinds of actuators provided in the engine EG. For example, a fuel injector and the like are included.

The ECU 200A controls the various kinds of actuators 220 based on the detection results of the various kinds of sensors 210. In control processing of the engine EG, the ECU 200A sets a target rotation speed (to be sometimes referred to as a target engine speed) for control of the engine EG. In this embodiment, the ECU 200A transmits information including an actual engine speed detected by the rotation speed sensor 211 and a set target rotation speed to the ECU 100A. Note that an arrangement in which the ECU 100A is electrically connected to the rotation speed sensor 211 and acquires the actual rotation speed of the engine EG without the intervention of the ECU 200A can also be employed.

The ECU 100A transmits information (load information) about the load of the automatic transmission 1 to the ECU 200A as information used by the ECU 200A to do engine control. In this embodiment, the load information represents the load of the automatic transmission 1 borne by the engine EG. When the load of the automatic transmission 1 is large, the ECU 200A, for example, increases the output torque of the engine EG. This is implemented by, for example, increase control of fuel supply or air intake amount. When the load of the automatic transmission 1 is small, the ECU 200A, for example, decreases the output torque of the engine EG.

The load of the automatic transmission 1 includes, for example, the inertia about the input shaft 10, the load of the oil pump, the drag torque in the release state of the lock-up clutch LC, and the like. In this embodiment, focus is placed on the drag torque, and the load information includes at least the drag torque.

In a cold climate area, the vehicle is sometimes placed in an extremely cold environment (for example, −30° C.). If the operations of the automatic transmission 1 and the engine EG stop for a long time (for example, 8 hrs or more), the liquidity of the hydraulic oil becomes poor, and the drag torque of the lock-up clutch LC increases (so-called sticking). When performing the first in-gear from the neutral state after the start of the engine EG, the output torque of the engine EG is increased, thereby solving the sticking while keeping the engine speed to the target rotation speed. However, the drag torque of the lock-up clutch LC (in other words, the degree of sticking) can vary due to the individual difference of the torque converter TC or the state (oil temperature) of the hydraulic oil. If the increase amount of the output torque of the engine EG is even, a case in which the output torque of the engine EG is too large or a case in which the output torque of the engine EG is too small to keep the engine speed to the target rotation speed or more may occur.

In this embodiment, the ECU 100A specifies the drag torque by referring to the ETR or oil temperature immediately before in-gear, and transmits load information including the drag torque to the ECU 200A. Specifying of the drag torque is performed using the map 102a. The ECU 200A can perform driving control of the engine EG corresponding to the drag torque. Driving control of the engine EG for the load on the side of the automatic transmission 1 can be performed as feed forward control corresponding to the individual difference or temperature environment, and more proper driving control of the engine EG can be performed.

<Example of Control>

Figure 5:
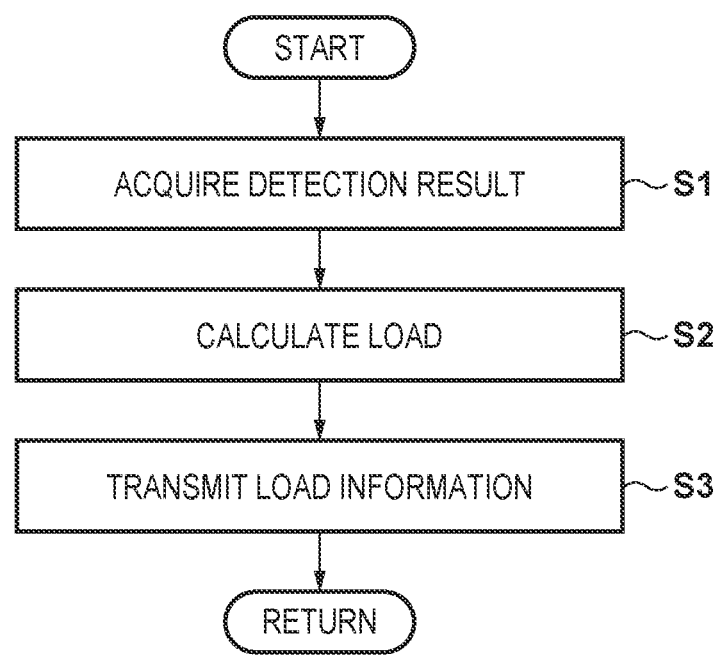
FIG. 5 is a flowchart showing an example of processing of a control apparatus shown in FIG. 4.

An example of control processing executed by the ECU 100A will be described. An example of processing associated with transmission of load information to the ECU 200A will be explained here. FIG. 5 is a flowchart showing an example of the processing. The processing shown in FIG. 5 is periodically performed.

In step S1, the detection results of the sensors 110 are acquired. In step S2, the load of the automatic transmission 1 to be borne by the engine EG is calculated based on the detection results acquired in step S1. In step S3, load information representing the load calculated in step S2 is transmitted to the ECU 200A. The ECU 200A performs driving control of the engine EG based on the load information. Basically, when the load of the automatic transmission 1 represented by the load information decreases, the output torque of the engine EG is decreased. When the load of the automatic transmission 1 increases, the output torque of the engine EG is increased.

Figure 6:
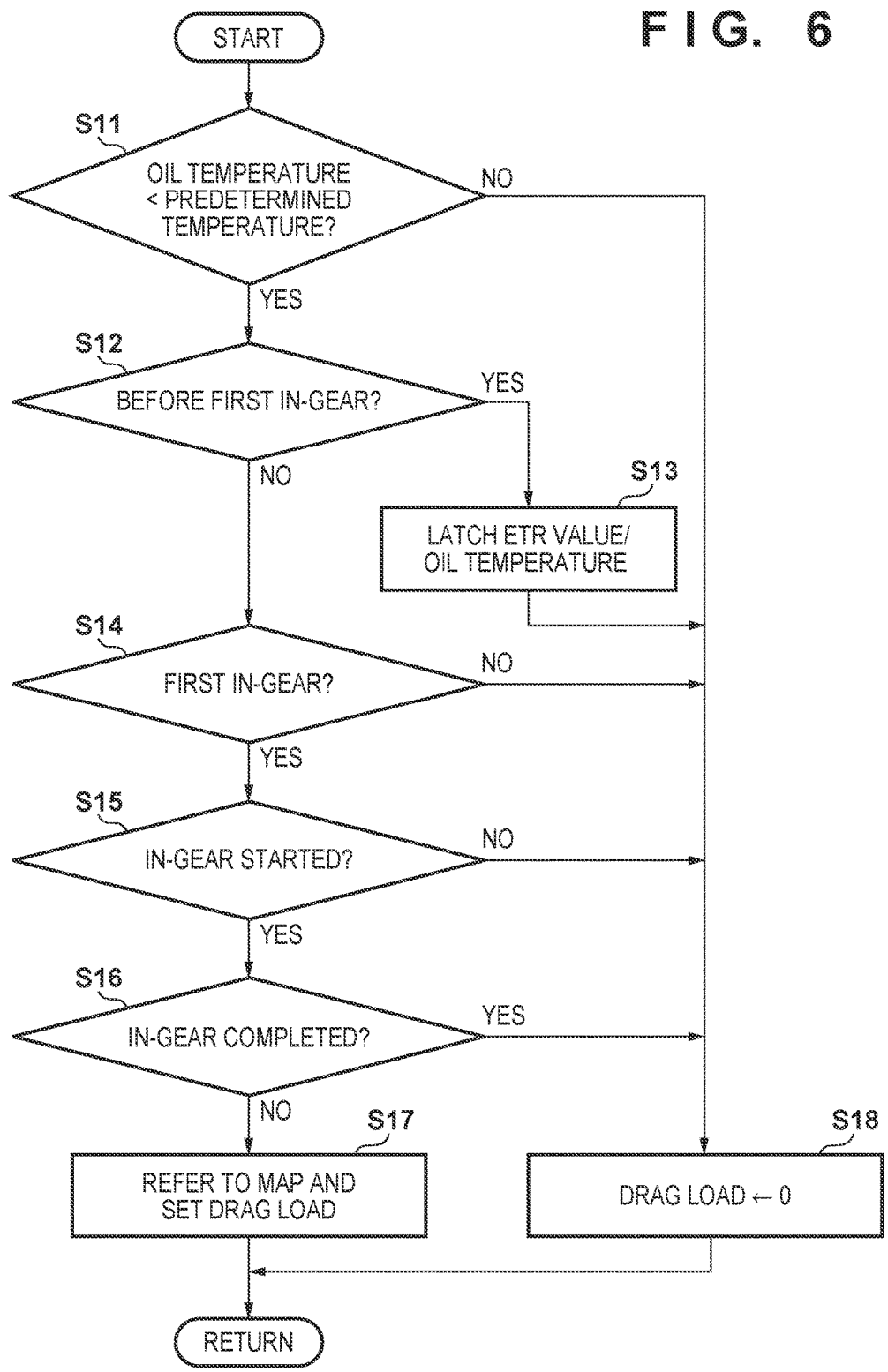
FIG. 6 is a flowchart showing an example of processing of the control apparatus shown in FIG. 4.

FIG. 6 shows processing associated with specifying of the drag torque of the lock-up clutch LC, which is a part of processing of load calculation in step S2. In step S11, it is determined whether the detection result of the oil temperature sensor 113 is lower than a predetermined temperature. If the detection result is lower than the predetermined temperature, the process advances to step S12. If the detection result is equal to or higher than the predetermined temperature, the process advances to step S18. The predetermined temperature is set to, for example, a temperature at which sticking of the lock-up clutch LC can occur.

In step S12, it is determined whether the state is a state before the first in-gear after the start of the engine EG. The state before the first in-gear is, for example, the neutral state immediately before the shift lever is operated from the P range to the D range to perform in-gear to the 1st gear, and the lock-up clutch LC is in the release state. If it is determined that the state is a state before the first in-gear, the process advances to step S13. Otherwise, the process advances to step S14.

In step S13, an ETR value and an oil temperature value based on the detection results of the sensors 110 are latched (saved in a specific storage area of the storage unit 102). By the process of step S13, the saved ETR value and oil temperature value are repetitively updated until the first in-gear is started, and the values immediately before the in-gear are held. After step S13, the process advances to step S18.

Processing from step S14 is associated with processing in a case in which the in-gear start condition is satisfied. In step S14, it is determined whether the current in-gear is the first in-gear (for example, in-gear to the 1st gear) after the start of the engine EG. If the current in-gear is the first in-gear, the process advances to step S15. If the current in-gear is the second or subsequent in-gear, the process advances to step S18. Whether the current in-gear is the first in-gear after the start of the engine EG can be determined by storing the history in the storage unit 102.

In step S15, it is determined whether in-gear is started. If in-gear is started, the process advances to step S16. Otherwise, the process advances to step S18. Whether in-gear is started can be determined based on, for example, the ETR. More specifically, letting ETR0 be the ETR immediately before the in-gear, which is latched in step S13, it can be determined that in-gear is being performed when current ETR≤ETR0−predetermined value is satisfied. That is, when the ETR value lowers by a predetermined value or more, it is determined that in-gear is started. The predetermined value may be a value that varies based on the oil temperature.

As another determination method, when the engine speed becomes lower than the target rotation speed by a predetermined value or more, it may be determined that in-gear is started. As still another determination method, it may be determined that in-gear is started on condition that a predetermined time has elapsed from the in-gear start instruction in control.

In step S16, it is determined whether the in-gear is completed. If the in-gear is completed, the process advances to step S18. Otherwise, the process advances to step S17. For example, in an arrangement including a rotation speed sensor provided for each of rotational elements to be fastened by a clutch put in gear, when the rotation difference between the rotational elements becomes a predetermined rotation speed or less, it can be determined that the in-gear is completed. The predetermined rotation speed may be a value that varies based on the oil temperature. As another determination method, when the rotation speed ratio between the input shaft rotation speed and the output shaft rotation speed becomes a rotation speed ratio corresponding to the gear range to put in gear, it can be determined that the in-gear is completed. As still another determination method, it may be determined that the in-gear is completed on condition that a predetermined time has elapsed after it is determined that the in-gear is started in step S15.

In step S17, the drag torque corresponding to the ETR value and the oil temperature latched in step S13 is specified by referring to the map 102a, and load setting is performed. The process of step S17 is performed during the time after the start of in-gear is determined in step S15 until the completion of in-gear is determined in step S16, that is, during the first in-gear.

In step S18, the load by the drag torque is set to 0. This embodiment mainly aims at solving sticking of the lock-up clutch LC. When sticking is solved, output correction of the engine torque associated with the load by the drag torque is not performed.

The processing thus ends. In this embodiment, output correction of the engine torque corresponding to the variation in the sticking state caused by the individual difference or the degree of warm-up of the automatic transmission 1 can be performed using the ETR value latched in step S13 for load setting in step S17. For this reason, excessive lowering of the rotation speed of the engine EG is prevented while solving the sticking of the lock-up clutch LC. In addition, output correction of the engine torque corresponding to the variation in the sticking state caused by the degree of warm-up or the temperature environment in which the automatic transmission 1 is placed can be performed using the oil temperature latched in step S13. Accordingly, excessive lowering of the rotation speed of the engine EG is further prevented while solving the sticking of the lock-up clutch LC. According to this embodiment, the stability of the engine speed is improved when controlling the output torque of the engine EG in correspondence with the drag torque of the lock-up clutch LC.

Other Embodiments

In the above embodiment, the process of step S17 is executed only at the time of the first in-gear after the engine start. However, the process of step S17 can be executed at the time of a subsequent in-gear as well. This is effective when, for example, the drag load is still large after the sticking is solved.

In the above embodiment, the oil temperature detection result is latched in the process of step S13, and the map 102a is referred to using the latched oil temperature in the process of step S17. However, an arrangement that uses not the oil temperature but only the ETR value can also be employed. However, when the oil temperature is also used, accurate correction control of the engine output torque can be performed.

In the above embodiment, the map 102a is referred to in the process of step S17. However, an arrangement that does not prepare the map 102a and calculates the load every time using a predetermined arithmetic expression can also be employed.

Summary of Embodiment

1. A control apparatus (for example, 100) according to the above embodiment is a control apparatus for controlling an automatic transmission (for example, 1) including a torque converter (for example, TC) to which a driving force of an engine (for example, EG) is input, the torque converter including a wet friction type lock-up clutch (for example, LC), the control apparatus comprises:

a specifying unit (for example, 101, S2, FIG. 6) configured to specify a drag torque of the lock-up clutch; and a transmission unit (for example, 101, 103, S3) configured to transmit load information including at least the drag torque specified by the specifying unit to a control apparatus (for example, 200A) of the engine, and the specifying unit specifies the drag torque of the lock-up clutch during in-gear based on a slip ratio of the torque converter before in-gear when the lock-up clutch is released (for example, S13, S17).

According to this arrangement, the drag torque is specified based on the slip ratio of the torque converter before in-gear, thereby controlling the output torque of the engine in correspondence with the drag torque of the lock-up clutch that varies due to an individual difference or the like, and improving the stability of the engine speed.

2. In the above embodiment,
the specifying unit specifies the drag torque during first in-gear after a start of the engine based on the slip ratio before the in-gear when the lock-up clutch is released (for example, S14-S17).

According to this arrangement, it is possible to solve sticking of the lock-up clutch that varies due to an individual difference or the like.

3. In the above embodiment,
the control apparatus further comprises an oil temperature detection unit (for example, 113) configured to detect an oil temperature of hydraulic oil of the lock-up clutch, and
the specifying unit specifies the drag torque during the first in-gear based on the slip ratio before the in-gear when the lock-up clutch is released at least on condition that a detection result of the oil temperature detection unit is lower than a predetermined temperature (for example, S11).

According to this arrangement, it is possible to perform correction of the output torque of the engine only when sticking of the lock-up clutch occurs in a cold environment.

4. In the above embodiment,
the specifying unit specifies the drag torque during the first in-gear based on the slip ratio before the in-gear and the detection result of the oil temperature detection unit (for example, S17).

According to this arrangement, it is possible to perform correction of the output torque of the engine in correspondence with an ambient temperature environment in addition to the individual difference of the automatic transmission.

5. In the above embodiment,
the control apparatus further comprises a storage unit (for example, 102) configured to store a map (for example, 102a) representing a relationship between the drag torque of the lock-up clutch and the slip ratio and the oil temperature of the hydraulic oil, and
the specifying unit specifies the drag torque during the first in-gear by referring to the map (for example, S17).

According to this embodiment, quick and proper processing can be performed by using the map.

6. A control system according to the above embodiment is a control system comprising:
a first control apparatus (for example, 200) configured to control an engine (for example, EG); and
a second control apparatus (for example, 100) configured to control an automatic transmission (for example, 1) including a torque converter (for example, TC) to which a driving force of the engine is input, the torque converter including a wet friction type lock-up clutch (for example, LC),
wherein the second control apparatus comprises:
a specifying unit (for example, 101, S2, FIG. 6) configured to specify a drag torque of the lock-up clutch; and
a transmission unit (for example, 101, 103, S3) configured to transmit load information including at least the drag torque specified by the specifying unit to a control apparatus of the engine,
the first control apparatus executes driving control of the engine based on the load information, and
the specifying unit specifies the drag torque of the lock-up clutch during in-gear based on a slip ratio of the torque converter before in-gear when the lock-up clutch is released (for example, S13, S17).

According to this arrangement, the drag torque is specified based on the slip ratio of the torque converter before in-gear, thereby controlling the output torque of the engine in correspondence with the drag torque of the lock-up clutch that varies due to an individual difference or the like, and improving the stability of the engine speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-065741, filed Mar. 29, 2017, which is hereby incorporated by reference herein in its entirety.

What is claimed is:

1. A control apparatus for controlling an automatic transmission including a torque converter to which a driving force of an engine is input, the torque converter including a wet friction type lock-up clutch,
the control apparatus comprises:
an estimating unit configured to estimate a drag torque of the lock-up clutch which is a drag torque in a state in which the automatic transmission becomes in-gear; and
a communication unit configured to transmit load information including at least the drag torque estimated by the estimating unit to a control apparatus of the engine, and
the estimating unit estimates the drag torque of the lock-up clutch based on a slip ratio of the torque converter which is a slip ratio in a state in which the automatic transmission is not in-gear and the lock-up clutch is released.

2. The apparatus according to claim 1, wherein the estimating unit estimates the drag torque in a state in which the automatic transmission becomes first in-gear after a start of the engine based on the slip ratio.

3. The apparatus according to claim 2, further comprising an oil temperature detection unit configured to detect an oil temperature of hydraulic oil of the lock-up clutch,
wherein the estimating unit estimates the drag torque in the state in which the automatic transmission becomes the first in-gear based on the slip ratio at least on condition that a detection result of the oil temperature detection unit is lower than a predetermined temperature.

4. The apparatus according to claim 3, wherein the estimating unit estimates the drag torque based on the slip ratio and the detection result of the oil temperature detection unit.

5. The apparatus according to claim 4, further comprising a storage unit configured to store a map representing a relationship between the drag torque of the lock-up clutch and the slip ratio and the oil temperature of the hydraulic oil,
wherein the estimating unit estimates the drag torque by referring to the map.

6. A control system comprising:
a first control apparatus configured to control an engine; and
a second control apparatus configured to control an automatic transmission including a torque converter to which a driving force of the engine is input, the torque converter including a wet friction type lock-up clutch,
wherein the second control apparatus comprises:
an estimating unit configured to estimate a drag torque of the lock-up clutch which is a drag torque in a state in which the automatic transmission becomes in-gear; and
a communication unit configured to transmit load information including at least the drag torque specified by the specifying unit to the first control apparatus,
the first control apparatus executes driving control of the engine based on the load information, and the estimating unit estimates the drag torque of the lock-up clutch based on a slip ratio of the torque converter which is a slip ratio in a state in which the automatic transmission is not in-gear and the lock-up clutch is released.

\* \* \* \* \*